United States Patent
Yahata et al.

(10) Patent No.: US 8,873,975 B2
(45) Date of Patent: Oct. 28, 2014

(54) IMAGE ERASING APPARATUS AND IMAGE ERASING METHOD

(71) Applicants: Kabushiki Kaisha Toshiba, Tokyo (JP); Toshiba Tec Kabushiki Kaisha, Tokyo (JP)

(72) Inventors: Isao Yahata, Shizuoka (JP); Ken Iguchi, Shizuoka (JP); Takahiro Kawaguchi, Shizuoka (JP); Hiroyuki Taguchi, Shizuoka (JP); Hiroyuki Tsuchihashi, Shizuoka (JP); Hiroyuki Taki, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/902,441

(22) Filed: May 24, 2013

(65) Prior Publication Data

US 2013/0258027 A1  Oct. 3, 2013

Related U.S. Application Data

(62) Division of application No. 13/046,509, filed on Mar. 11, 2011, now Pat. No. 8,538,280.

(60) Provisional application No. 61/314,107, filed on Mar. 15, 2010, provisional application No. 61/314,108, filed on Mar. 15, 2010.

(51) Int. Cl.
| | |
|---|---|
| *G03G 15/00* | (2006.01) |
| *G03G 21/00* | (2006.01) |
| *H04N 1/203* | (2006.01) |
| *G06K 15/02* | (2006.01) |
| *H04N 1/23* | (2006.01) |
| *H04N 1/00* | (2006.01) |

(52) U.S. Cl.
CPC ............... *G06K 15/02* (2013.01); *H04N 1/203* (2013.01); *H04N 1/2032* (2013.01);
(Continued)

(58) Field of Classification Search
USPC ............ 399/1, 16, 23, 389, 390, 411; 430/97; 347/179
See application file for complete search history.

(56) References Cited

U.S. PATENT DOCUMENTS

| | | | | |
|---|---|---|---|---|
| 5,532,847 A | * | 7/1996 | Maruyama | ..................... 399/1 X |
| 5,545,381 A | | 8/1996 | Iida et al. | |

(Continued)

FOREIGN PATENT DOCUMENTS

| | | |
|---|---|---|
| JP | H07-239595 | 9/1995 |
| JP | 2002-245075 | 8/2002 |

(Continued)

OTHER PUBLICATIONS

Machine translation of JP 2004-228684 printed on Mar. 3, 2014.*

(Continued)

*Primary Examiner* — Sophia S Chen
(74) *Attorney, Agent, or Firm* — Patterson & Sheridan LLP

(57) ABSTRACT

An image erasing apparatus includes a scanning unit; a memory unit; an erasing unit; a first conveying unit includes a first conveying direction as a conveying direction of the sheet; a storage unit that stores the sheet which is scanned by the scanning unit and is not conveyed to the erasing unit by the first conveying unit; a second conveying unit that once conveys the sheet from the first conveying unit to the storage unit, then return the sheet to the first conveying unit; and an interface unit that displays the image data stored in the memory unit and receives an instruction from a user, when the instruction for erasure is received, the interface unit operates the first conveying unit and the second conveying unit so as to conveys to the erasing unit, the sheet stored in the storage unit.

14 Claims, 9 Drawing Sheets

(52) U.S. Cl.
 CPC ...... *H04N 2201/0094* (2013.01); *H04N 1/2323* (2013.01); *H04N 1/00633* (2013.01); *H04N 1/00567* (2013.01); *H04N 1/00803* (2013.01)
 USPC .................. 399/1; 347/179; 399/16; 399/389; 399/411

(56) References Cited

U.S. PATENT DOCUMENTS

| | | | |
|---|---|---|---|
| 6,466,764 | B2 | 10/2002 | Jacob |
| 7,283,758 | B2 | 10/2007 | Murakami |
| 8,260,188 | B2 | 9/2012 | Yahata et al. |
| 2009/0154970 | A1 | 6/2009 | Yoshida et al. |
| 2010/0315475 | A1 | 12/2010 | Taki et al. |
| 2011/0221851 | A1 | 9/2011 | Kawaguchi et al. |
| 2011/0222951 | A1 | 9/2011 | Yahata et al. |

FOREIGN PATENT DOCUMENTS

| | | |
|---|---|---|
| JP | 2003-346195 | 12/2003 |
| JP | 2004-228684 | 8/2004 |
| JP | 2009-010758 | 1/2009 |

OTHER PUBLICATIONS

Office Action dated Sep. 3, 2013, filed in Japanese counterpart application No. 2011-055197 (English translation).

* cited by examiner

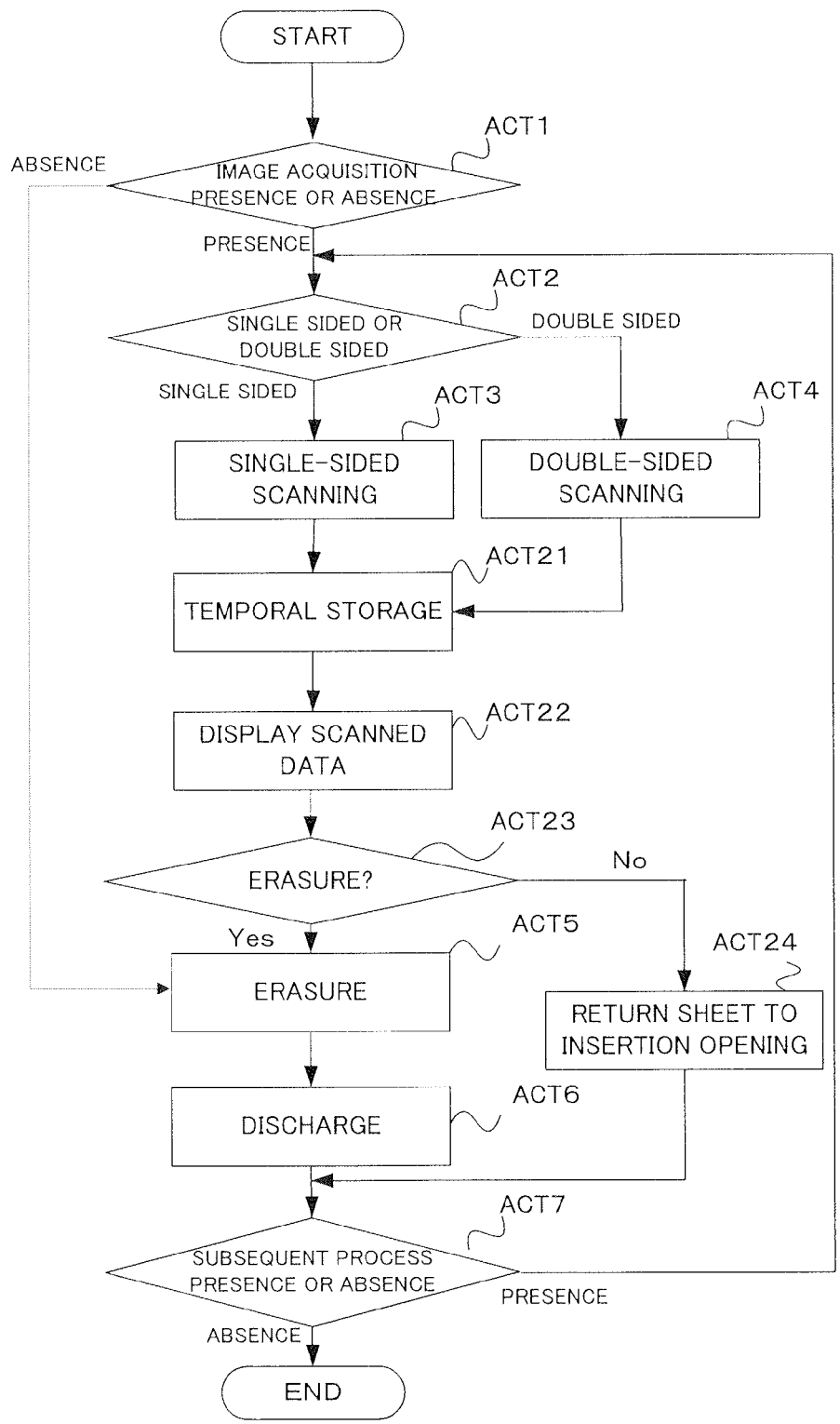

IMAGE ERASING APPARATUS AND IMAGE ERASING METHOD

CROSS-REFERENCE TO RELATED APPLICATION

This application is a divisional of U.S. patent application Ser. No. 13/046,509, filed on Mar. 11, 2011, which is based upon and claims the benefit of priority from: U.S. provisional application 61/314,107, filed on May 15, 2010; and U.S. provisional application 61/314,108, filed on May 15, 2010; the entire contents all of which are incorporated herein by reference.

FIELD

Embodiments described herein relate generally to a technique for erasing an image on a sheet.

BACKGROUND

There is an image erasing apparatus that erases an image on a printed sheet using toner having a property of being made achromatic as heat is applied thereto at a predetermined or higher temperature.

In addition, there may be a case where after the image on the sheet is erased, information of the sheet is needed again.

DESCRIPTION OF THE DRAWINGS

FIG. 9 is a diagram showing a flowchart of the image erasing apparatus according to the third embodiment.

DETAILED DESCRIPTION

An image erasing apparatus includes a scanning unit, a memory unit, a erasing unit, a first conveying unit, a storage unit, a second conveyance unit, a second conveyance unit, and an interface unit. The scanning unit converts an image formed on a sheet into image data. The memory unit stores the image data. The erasing unit erases the image formed on the sheet. The first conveying unit includes a first conveying direction as a conveying direction of the sheet, the first conveying direction conveys the sheet first to the scanning unit and then to the erasing unit. The storage unit stores the sheet which is scanned by the scanning unit and is not conveyed to the erasing unit by the first conveyance unit. The second conveyance unit once conveys the sheet from the first conveying unit to the storage unit, then return the sheet to the first conveyance unit. The interface unit displays the image data stored in the memory unit and receives an instruction from a user, when the instruction for erasure is received, the interface unit operates the first conveyance unit and the second conveyance unit so as to conveys to the erasing unit, the sheet stored in the storage unit.

In embodiments described hereinafter, a technique for computerizing an image on a sheet before erasing the image from the sheet and storing the image in a memory unit is provided.

First Embodiment

Figure 1:
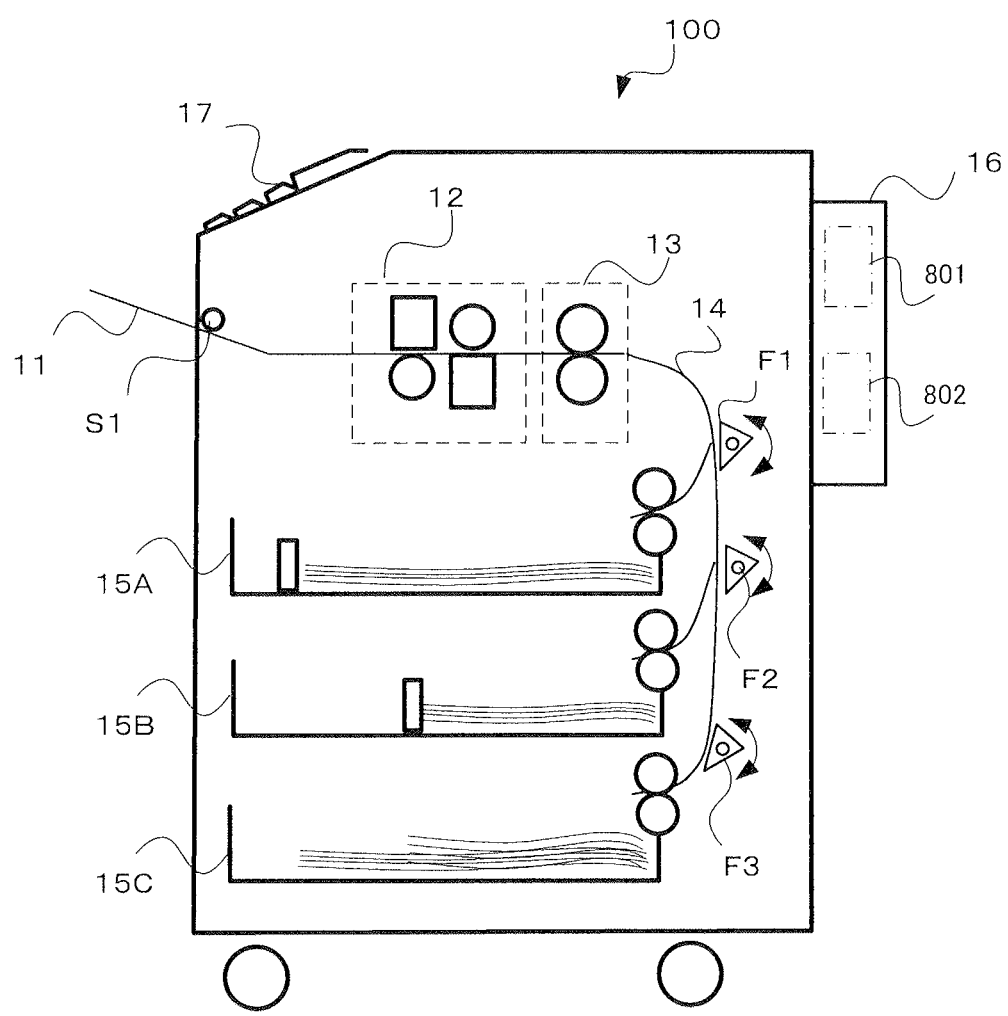
FIG. 1 is a diagram showing the configuration of an image erasing apparatus according to a first embodiment.

FIG. 1 is a schematic diagram showing the configuration of an image erasing apparatus according to a first embodiment. An image erasing apparatus 100 has a sheet insertion opening 11, a scanner device 12, a print erasing device 13, a carrying unit 14, stacking cassettes 15A to 15C, a control device 16, and a control panel 17.

The sheet insertion opening 11 is a tray on which a sheet from which an image is to be erased is provided, and includes a sensor S1 that detects whether or not a sheet is provided. The scanner device 12 has a CCD sensor and reads image information on the sheet to convert the read image information into electronic data. In addition, in the scanner device 12, two CCDs are installed on upper and lower sides of the sheet to be symmetrical so as to simultaneously scan front and rear sides of the sheet. The print erasing device 13 has heaters that apply a predetermined temperature to the sheet read by the scanner device 12 so as to achromatize toner formed on the sheet. In the print erasing device 13, two heaters are disposed to abut the front and rear sides of the carried sheet so as to heat both sides of the sheet.

The carrying unit 14 includes flappers F1 to F3, a carrying roller (not shown), and a carrying belt. The carrying unit 14 carries the sheet from the sheet insertion opening 11 to the scanner device 12 and the print erasing device 13 in this order, and carries the sheet from which the image is erased by the print erasing device 13 to the stacking cassettes 15A to 15C. The flappers F1 to F3 of the carrying unit 14 are rotated under the control of the control device 16 so as to switch a carriage pathway of the sheet. The sheets are sorted by the guidance of the flappers F1 to F3 depending on the size.

The stacking cassettes 15A to 15C are cassettes that accumulate the sheets after erasure and in the first embodiment, accommodate the sheets depending on the size. The control device 16 is a unit that controls the overall hardware of the image erasing apparatus 100 and includes a processor 801 which is an operation processing device (for example, a CPU (Central Processing Unit)), and a memory 802 configured as a volatile or a non-volatile memory device. The processor 801 has a role of executing various processes in the image erasing apparatus 100 and also has a role of realizing various functions by executing programs stored in the memory 802. The memory 802 may be configured as, for example, a RAM (Random Access Memory), ROM (Read Only Memory), DRAM (Dynamic Random Access Memory), SRAM (Static Random Access Memory), VRAM (Video RAM), HDD (Hard Disk Drive), or the like, and has a function of storing various kinds of information and programs used for the image erasing apparatus 100. In addition, the memory 802 stores data or programs needed to be stored to be non-volatile and stores the image of the electronic data converted by the scanner device 12. The functions realized using the processor 801 and the memory 802 may be realized by an ASIC (Application Specific Integrated Circuit).

The control panel 17 has a touch panel display or a keyboard so as to receive a designation of a parameter or instruction from a user and displays the progress of a process or a status of the devices for the user.

Figure 2:
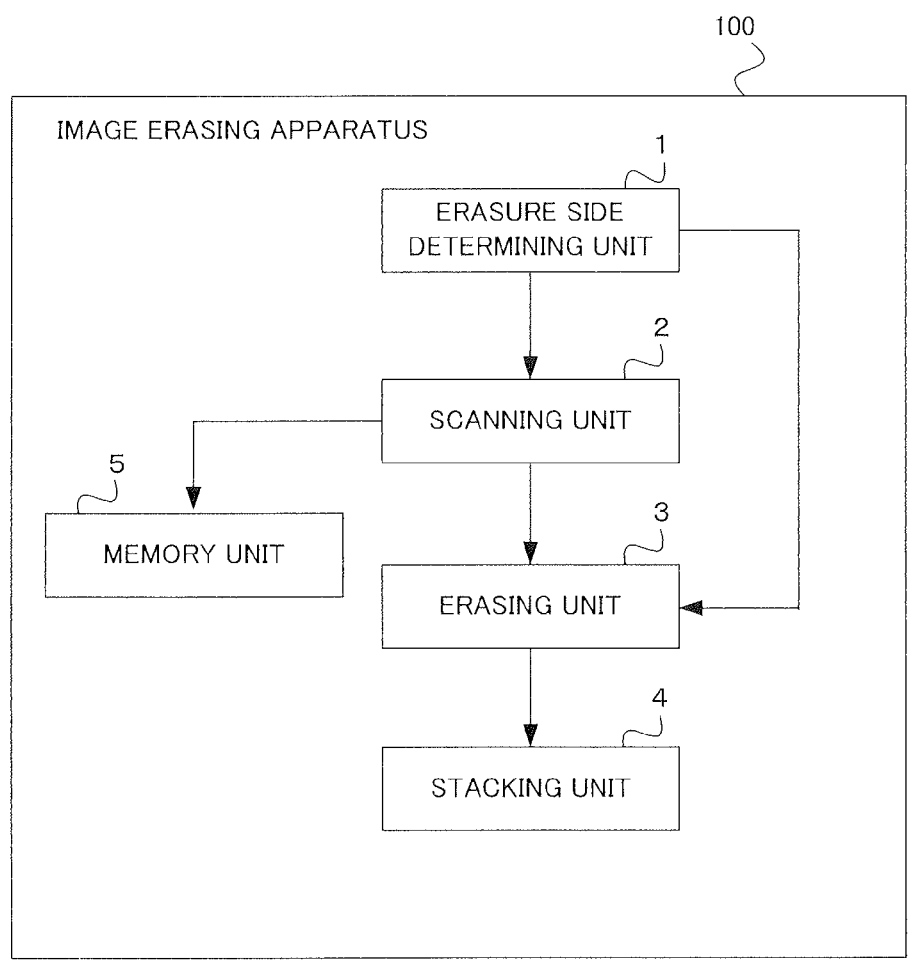
FIG. 2 is a block diagram of the image erasing apparatus according to the first embodiment.

Next, an example of a block diagram of the image erasing apparatus 100 is shown in FIG. 2. The image erasing apparatus 100 has an erasure side determining unit 1, a scanning unit 2, an erasing unit 3, a stacking unit 4, and a memory unit 5.

The erasure side determining unit 1 determines whether an image is formed on a single side or both sides, and in the case of the single side, determines whether the image is formed on a front side or a rear side. The scanning unit 2 scans the side where the image is formed on the basis of a determination result of the erasure side determining unit 1 and converts the image formed on the sheet into electronic data. The erasing unit 3 erases the image on the sheet side determined by the erasure side determining unit 1 on which the image is formed. The stacking unit 4 accumulates the sheets from which images are erased depending on the sheet size. In addition, the sizes of the sheets are determined by the scanning unit 2 and the sheets are sorted by the carrying unit 14. The memory unit 5 stores the image data computerized by the scanning unit 2. The memory unit 5 accumulates a plurality of packets of image data according to the capacitance of a storage area.

A correspondence between the block diagram of FIG. 2 and the configuration diagram of FIG. 1 will be described. The erasure side determining unit 1 is realized by the reading function of the scanner device 12 and the control device 16. The scanning unit 2 is realized by the reading function and the function of converting an image into electronic data of the scanner device 12, and the control device 16. The erasing unit 3 is realized by the print erasing device 13 and the control device 16. The stacking unit 4 is realized by the stacking cassettes 15A to 15C. The memory unit 5 is realized by the control device 16 (the memory 802).

Although not shown in FIG. 2, carriage of the sheet to each of the blocks is managed by the carrying unit 14.

Figure 3:
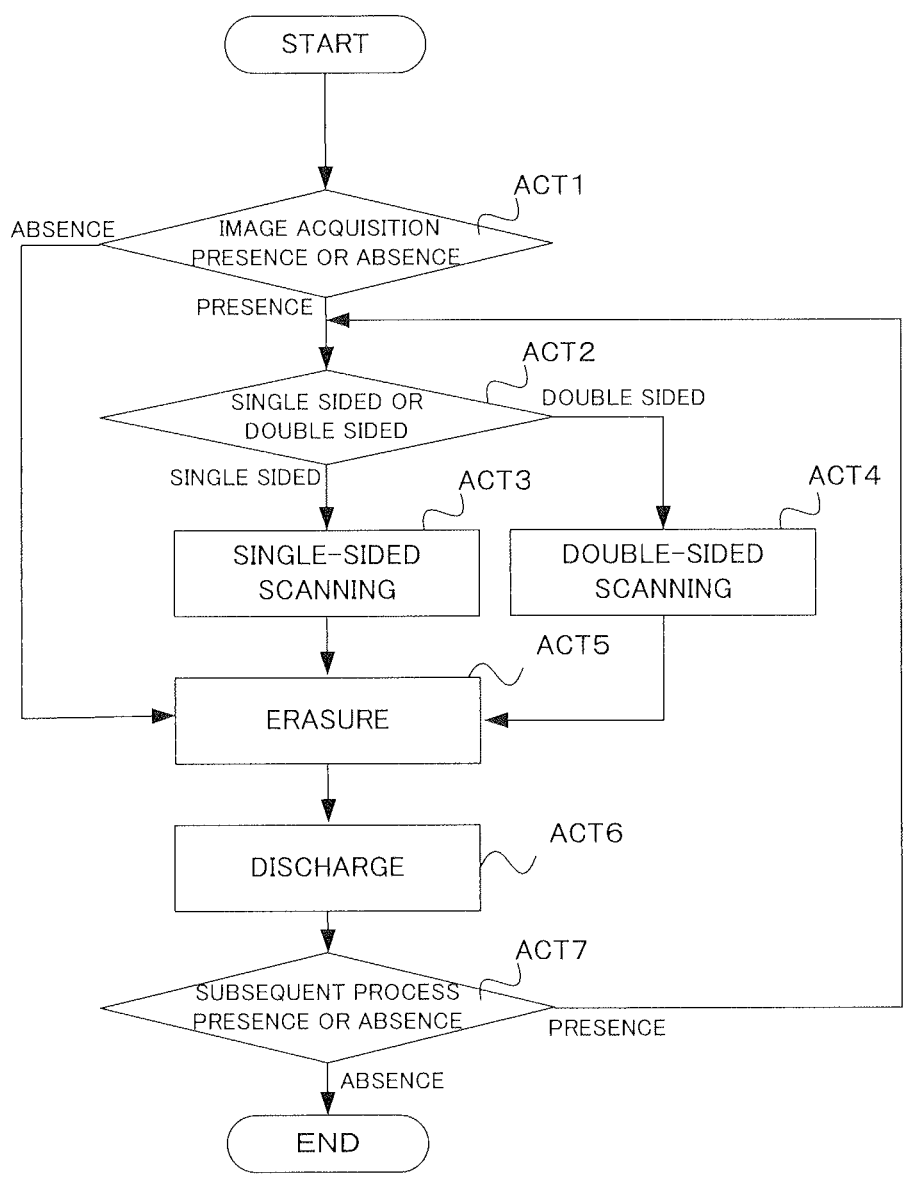
FIG. 3 is a diagram showing a flowchart of the image erasing apparatus according to the first embodiment.

Next, an operation example of the image erasing apparatus 100 will be described with reference to a flowchart of FIG. 3. First, whether or not to perform image acquisition is determined on the basis of an operation of the control panel 17 by the user (ACT 1). Here, when the image acquisition is not to be performed (ACT 1, Absence), the process proceeds to ACT 5. In this case, the carrying unit 14 carries the sheet to the print erasing apparatus 13 as it is. When the image acquisition is to be performed (ACT 1, Presence), the carrying unit 14 carries the sheet to the scanner device 12.

The erasure side determining unit 1 determines which side the image is formed on the sheet (ACT 2). The erasure side determining unit 1 scans both sides of the sheet using the scanner device 12 and determines presence or absence of an image by determining presence or absence of edges and shade.

If the image is formed on the single side (ACT 2, Single sided), the scanning unit 2 scans the side where the image is formed so as to be converted into electronic data, and stores the electronic data after the conversion in the memory unit 5 (ACT 3). When images are formed on both sides (ACT 2, Double sided), the scanning unit 2 scans the both sides so as to be converted into electronic data and stores each image in the memory unit 5 (ACT 4). In addition, the scanning unit 2 may also be mounted to store data read by the operation of the erasure side determining unit 1 in the memory unit 5.

Thereafter, the carrying unit 14 carries the sheet to the print erasing device 13. The erasing unit 3 acquires information regarding which side the image is formed from the erasure side determining unit 1, and applies heat to the sheet side where the image is formed using the heaters to erase the image (ACT 5). Thereafter, the carrying unit 14 carries the sheet from which the image is erased to the stacking unit 4 (ACT 6). In addition, when the sheet is disposed in the stacking unit 4, the control unit 16 acquires size information regarding the sheet determined by the scanning unit 2 and controls the directions of the flappers F1 to F3. Under the control, in the stacking unit 4, sheets sorted depending on the size are accumulated.

The control device 16 determines whether or not there is a sheet to be processed subsequently (ACT 7), and when there is a sheet (ACT 7, Presence), the process is returned to ACT 2. The control device 16 determines presence or absence of the subsequent sheet on the basis of whether or not a detection signal is received from the sensor S1 installed in the sheet insertion opening 11. When there is no sheet (ACT 7, Absence), the process is ended.

As such, since the image of the sheet is converted into electronic data before erasure and is stored in the memory unit, the image can be rewritten when the image data is needed after the erasure.

Second Embodiment

In the second embodiment, a configuration in which a sheet which is subjected to an erasing process by the erasing unit once is inspected again so as to determine whether or not there is a residual image will be described.

Figure 4:
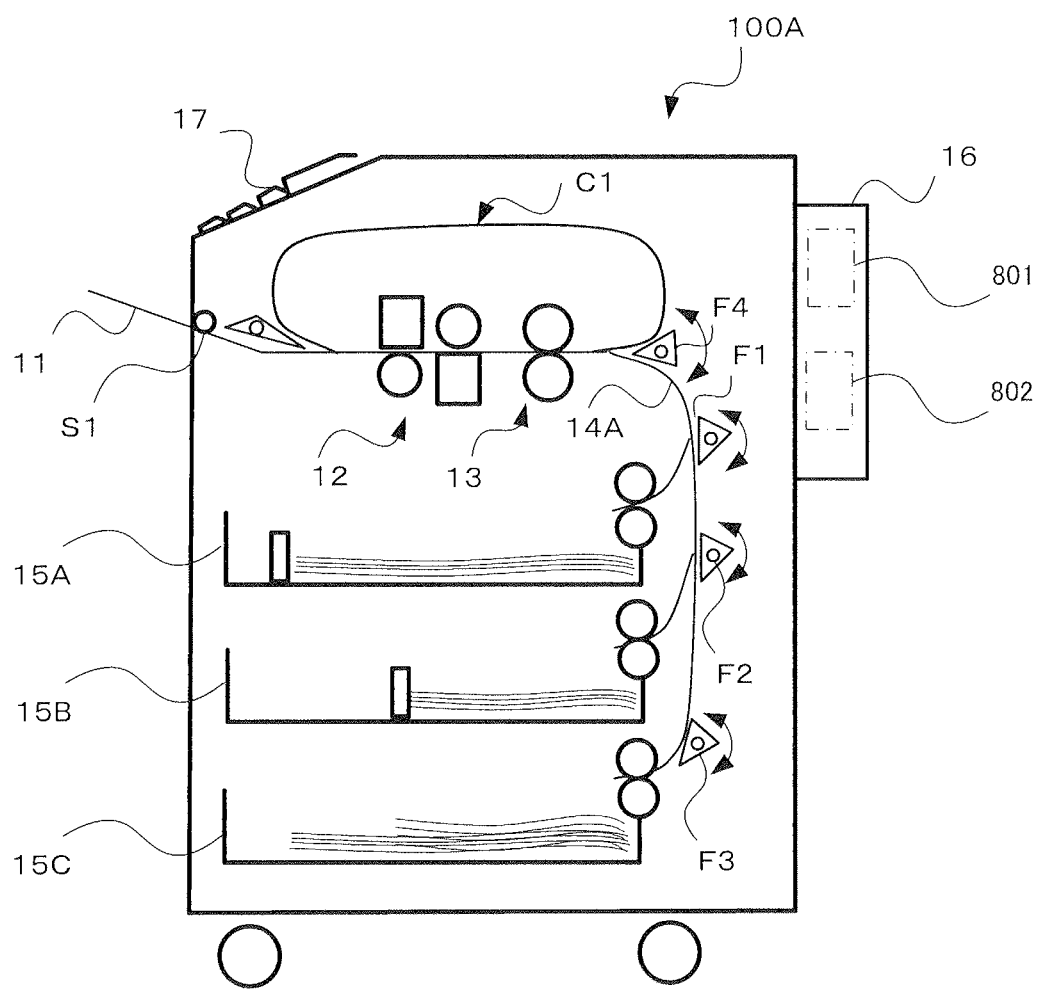
FIG. 4 is a diagram showing the configuration of an image erasing apparatus according to a second embodiment.

The configuration of an image erasing apparatus according to the second embodiment is shown in FIG. 4. A carrying unit 14A of the image erasing apparatus 100A further includes a flapper F4 in addition to the carrying unit 14 described according to the first embodiment and includes a circulation pathway C1 for carrying a sheet processed by the erasing device 13 to the scanner device 12 again.

A sheet disposed in the sheet insertion opening 11 is first carried to the scanner device 12 and the print erasing device 13 in this order by the carrying unit 14A as in the first embodiment. Thereafter, the sheet is carried in a direction of the circulation pathway C1 by switching a pathway of the flapper F4. The sheet is carried to the scanner device 12 again by the circulation pathway C1, and an inspection of a residual image is performed. The sheet on which the inspection of a residual image is finished is guided in the directions of the stacking cassettes 15A to 15C by the flapper F4.

In addition, like reference numerals the same as those of FIG. 1 denote like elements the same as those of the first embodiment, therefore detailed description will be omitted.

Figure 5:
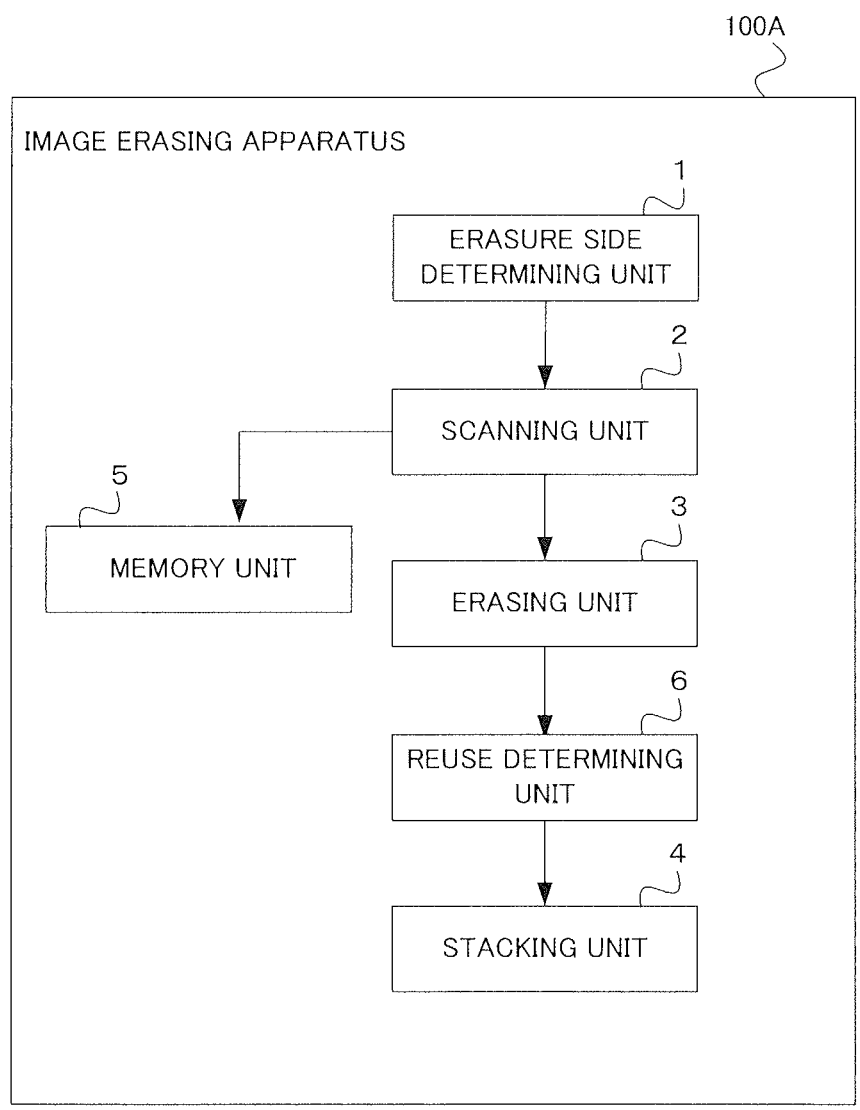
FIG. 5 is a block diagram of the image erasing apparatus according to the second embodiment.

A block diagram of the image erasing apparatus 100A is shown in FIG. 5. The image erasing apparatus 100A further includes a reuse determining unit 6 in addition to the image erasing apparatus 100 described according to the first embodiment. The reuse determining unit 6 determines whether or not there is residual toner on the sheet subjected to the erasing process. The reuse determining unit 6 scans the sheet carried again by the carrying unit 14A using the scanner device 12 and performs the edge detection process or the shade detection process described above, thereby determining presence or absence of a residual image. The reuse determining unit 6 is realized by the reading function of the scanner device 12 and the control device 16.

In addition, the carrying unit 14A carries a sheet which is determined to be non-reusable by the reuse determining unit 6 since a residual image is detected therefrom to the stacking cassette 15C, and carries a sheet which is determined to be reusable to the stacking cassettes 15A and 15B depending on the sheet size.

Figure 6:
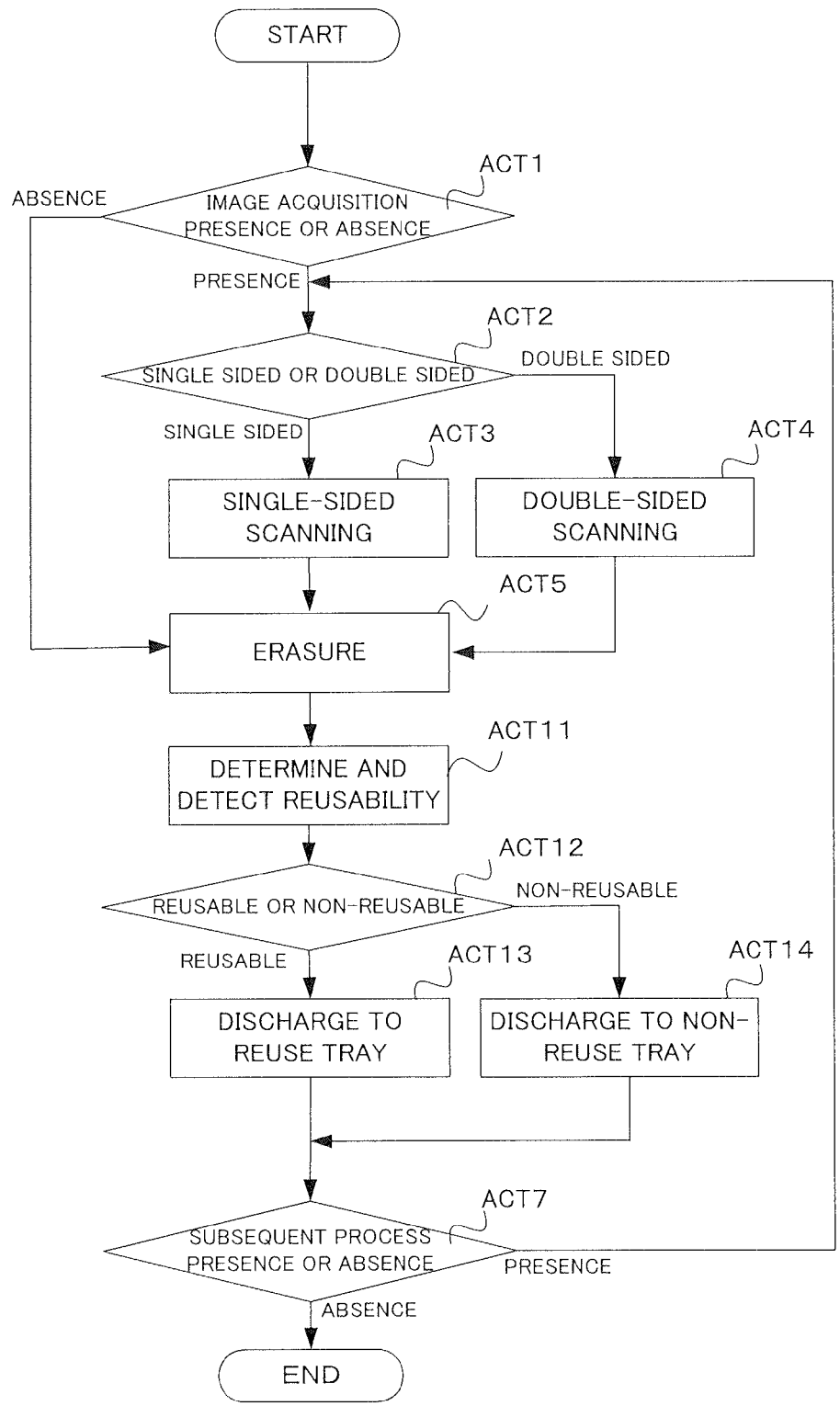
FIG. 6 is a diagram showing a flowchart of the image erasing apparatus according to the second embodiment.

Next, operations of the image erasing apparatus 100A will be described with reference to a flowchart of FIG. 6. Like reference numerals the same as those of FIG. 3 denote like elements the same as those of the first embodiment, therefore detailed description will be omitted.

After performing the erasing process in ACT 5, the carrying unit 14A carries the sheet to the scanner device 12 again using the circulation pathway C1 under the guidance of the flapper F4. Thereafter, the reuse determining unit 6 performs the edge detection process and the shade detection process by scanning the carried sheet (ACT 11) and determines presence or absence of a residual image (ACT 12). When there is no residual image (ACT 12, Reusable), the carrying unit 14A carries the sheet to the stacking cassette 15A or 15B on the basis of the guidance of the flappers F4, and F1 or F2 (ACT 13). On the other hand, when there is a residual image (ACT 12, Non-reusable), the carrying unit 4A carries the sheet to the stacking cassette 15C on the basis of the guidance of the flappers F4, and F1 to F3 (ACT 14).

In addition, the function of determining reusability described above may also be provided by the scanning unit 2.

Third Embodiment

When acquisition of image data and erasure of an image are continuously performed, the user cannot check whether or not the image data is stored in the memory unit reliably. The third embodiment describes an example in which a sheet is scanned and then temporarily stored and after the image data of the sheet stored in the memory unit is checked by the user, the image data is erased by the erasing unit.

Figure 7:
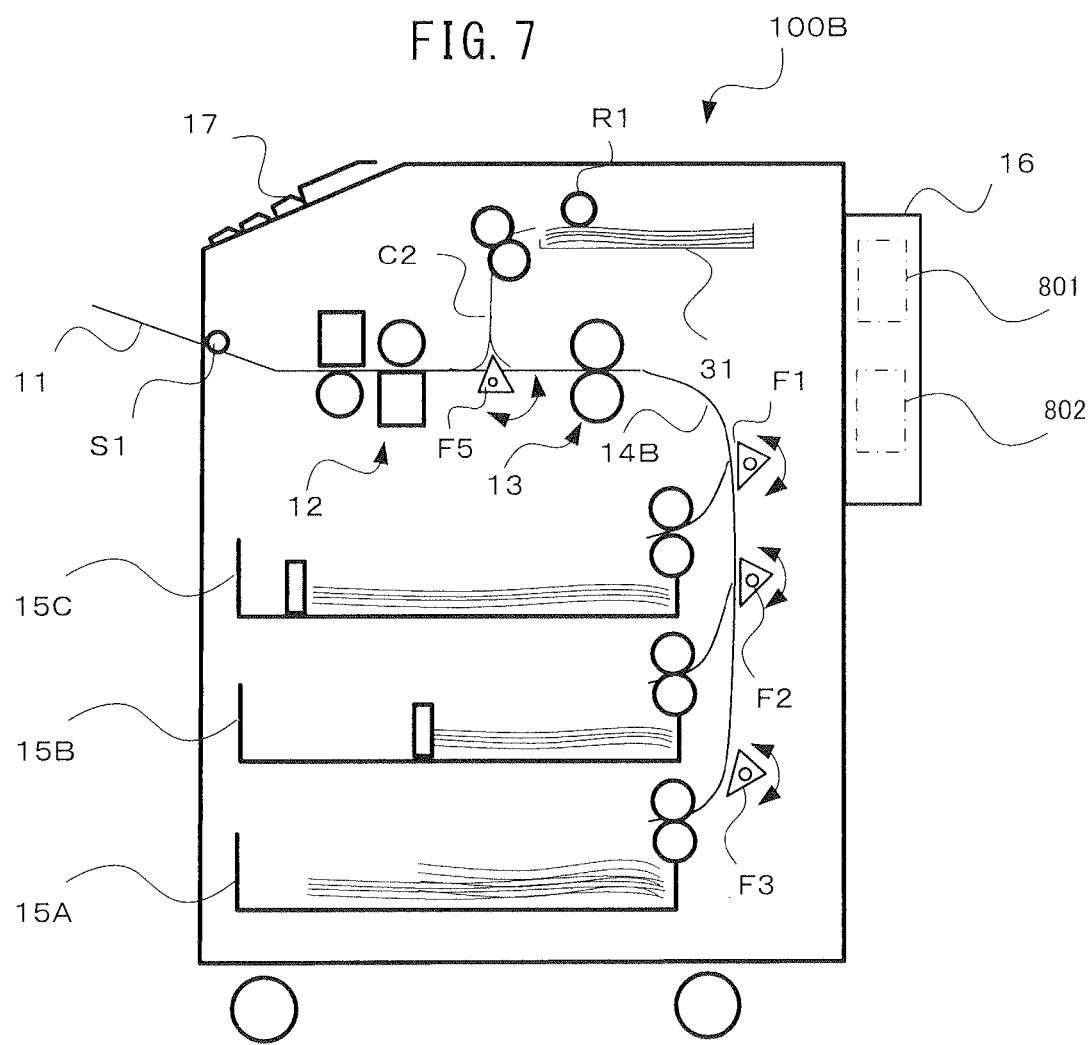
FIG. 7 is a diagram showing the configuration of an image erasing apparatus according to a third embodiment.

The configuration of the third embodiment is shown in FIG. 7. An image erasing apparatus 100B further includes a sheet storage tray 31 and a pickup roller R1 in addition to the configuration of the image erasing apparatus 100 according to the first embodiment, and a carrying unit 14B further includes a carriage pathway C2 to a flapper F5 and the sheet storage tray 31 in addition to the carrying unit 14.

The flapper F5 is provided between the scanner device 12 and the print erasing device 13 and guides the sheet scanned by the scanner device 12 in a direction of the sheet storage tray 31. The flapper F5 guides the sheet from the sheet storage tray 31 to the print erasing device 13 when an erasure instruction is received from the user, and guides the sheet from the sheet storage tray 31 in the direction of the sheet insertion opening 11 when an erasure cancel instruction is received from the user.

The sheet storage tray 31 is a tray that temporarily stores the sheet subjected to the scanning process. The pickup roller R1 picks up the sheet in the sheet storage tray 31.

Figure 8:
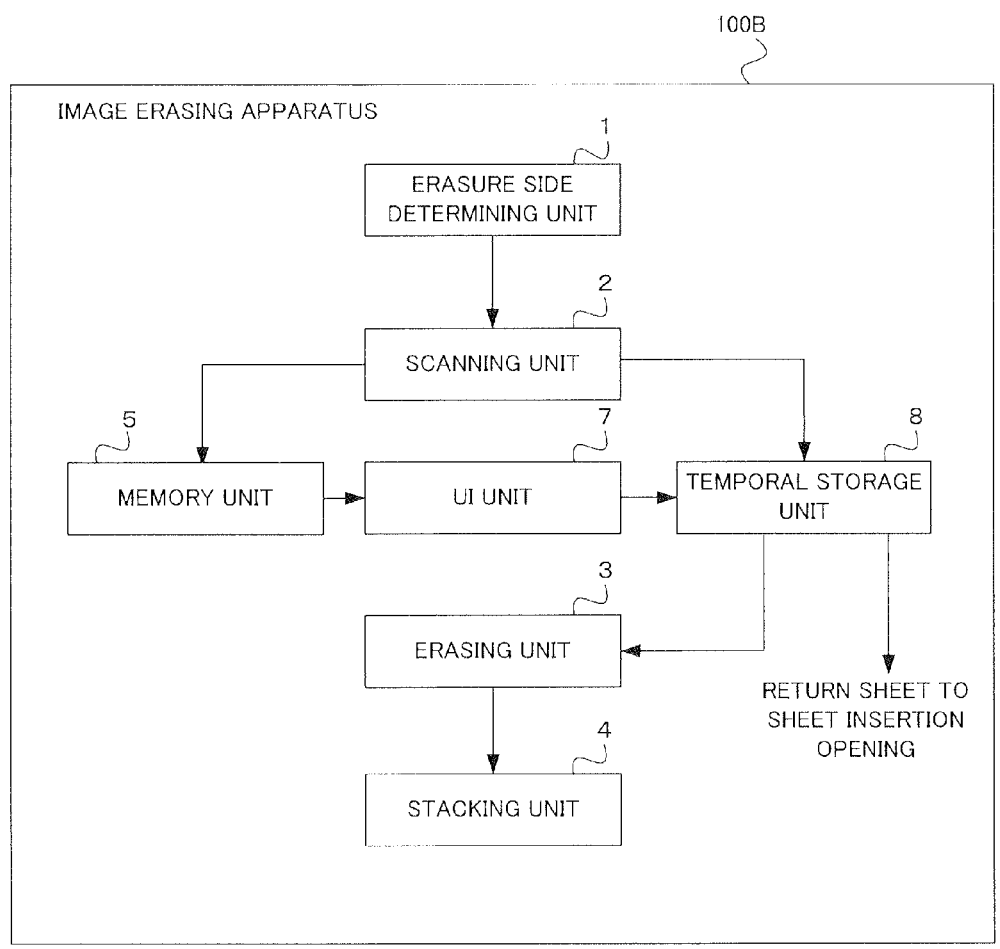
FIG. 8 is a block diagram of the image erasing apparatus according to the third embodiment.

Next, a block diagram of the image erasing apparatus 100B is shown in FIG. 8. The image erasing apparatus 100B further includes an UI (User Interface) unit 7 and a temporal storage unit 8 in addition to the image erasing apparatus 100 according to the first embodiment. Units other than the UI unit 7 and the temporal storage unit 8 are the same as those of the first embodiment, therefore detailed description thereof will be omitted.

The UI unit 7 displays the image data stored in the memory unit 5 on the control panel 17 and acquires the erasure instruction or the cancel instruction of the image formed on the sheet via the control panel 17 from the user.

The temporal storage unit 8 stores the sheet scanned by the scanning unit 2. When the erasure instruction is received from the user via the UI unit 7, the sheet stored in the temporal storage unit 8 is moved to a carriable position of the carrying unit 14B by the pickup roller R1, and the carrying unit 14B carries the sheet to the erasing unit 3. In addition, when the cancel instruction is received from the user via the UI unit 7, the sheet stored in the temporal storage unit 8 is moved to the carriable position of the carrying unit 14B by the pickup roller R1, and the carrying unit 14B carries the sheet to the sheet insertion opening 11.

Next, an operation example of the image erasing apparatus 100B will be described with reference to FIG. 9. In addition, like reference numerals the same as those of FIG. 3 denote like elements the same as those of the first embodiment, therefore detailed description will be omitted.

After either of single-sided scanning and double-sided scanning is performed by the scanning unit 2 (ACT 3 and ACT 4), the temporal storage unit 8 temporarily stores the sheet (ACT 21). Here, the flapper F5 is controlled by the control device 16 so as to be in a direction to guide the sheet to the sheet storage tray 31.

The UI unit 7 displays the image data that is currently scanned and stored in the memory unit 5 (ACT 22). The UI unit 7 acquires the erasure instruction or the cancel instruction from the user. When the acquired instruction is the erasure instruction (ACT 23, Yes), the temporal storage unit 8 discharges the stored sheet by rotating the pickup roller R1. The carrying unit 14B carries the discharged sheet to the print erasing apparatus 13. The erasing unit 3 erases the image formed on the sheet (ACT 5).

On the other hand, when the acquired information is the cancel instruction (ACT 23, No), the temporal storage unit 8 discharges the stored sheet by rotating the pickup roller R1. The carrying unit 14B carries the discharged sheet in the direction of the scanner device 12 so as to be carried to the sheet insertion opening 11 as it is.

In addition, when a plurality of sheets are collectively subjected to the erasing process, there may be a case where the user wants to check only whether or not image data is stored in the memory unit 5 rather than check precision of the stored image data. Here, when all of the sheets are displayed on the UI unit 7 and the user performs the erasure instruction on the sheets, the operation becomes complex. Therefore, in the third embodiment, when the plurality of sheets are processed collectively, the UI unit 7 displays the image data only of an initial single sheet. When the erasure instruction for the initial single sheet is received by the UI unit 7, the carrying unit 14B carries all of the sheets stored in the temporal storage unit 8 to the erasing unit 3. In addition, all of the image data may also be displayed.

As described in detail, according to the technique described through the specification, the image formed on the sheet is converted into the electronic data before erasure and is saved in the memory unit, so that the information can be provided when the erased information is needed.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the sprit of the inventions. The accompanying claims and their equivalents are intended to cover such forms or modifications as would fall within the scope and spirit of the inventions.

What is claimed is:
1. An image erasing apparatus comprising:
a sheet insertion opening configured to receive a sheet;
a sheet discharging unit configured to discharge the sheet;
a scanning unit configured to convert an image formed on the sheet into image data;

a memory unit configured to store the image data;
an erasing unit configured to erase the image formed on the sheet;
a first conveying unit that includes a conveying path from the sheet insertion opening to the sheet discharging unit and is configured to convey the sheet in a first conveying direction first to the scanning unit and then to the erasing unit;
a second conveying unit that branches from the first conveying unit at a downstream side of the scanning unit and an upstream side of the erasing unit in the first conveying direction;
a storage unit arranged on the second conveying unit and configured to store a sheet which is scanned by the scanning unit; and
an interface unit configured to display the image data stored in the memory unit and to receive an instruction from a user, wherein, when an instruction for erasure is received in the interface unit, the first conveying unit and the second conveying unit convey a sheet stored in the storage unit to the erasing unit.

2. The apparatus according to claim 1, further comprising a switching unit configured to switch a conveying direction to one of the first conveying direction and a direction opposite the first conveying direction.

3. The apparatus according to claim 2,
wherein the switching unit is disposed between the erasing unit and the scanning unit.

4. The apparatus according to claim 1, further comprising a stack unit that comprises a plurality of cassettes that holds sheets subjected to an image erasure by the erasing unit.

5. The apparatus according to claim 1, further comprising an image side determining unit configured to determine which side of the sheet that the image is formed on.

6. The apparatus according to claim 1,
wherein, when a plurality of the sheets is collectively processed, the interface unit displays the image data of only an initial single sheet, and
when the erasure instruction only for the initial single sheet is received by the interface unit, the first conveying unit conveys all of the sheets stored in the storage unit to the erasing unit.

7. The apparatus according to claim 1, wherein, when an instruction for cancelling erasure is received by the interface unit, the first conveying unit conveys the sheet stored in the storage unit in a direction opposite to the first sheet conveying direction.

8. The apparatus according to claim 1, wherein, the first conveying unit conveys the sheets so that the sheets subjected to the image erasure are held by different cassettes depending on the sheet size.

9. The apparatus according to claim 1, wherein the scanning unit scans both a front side and a rear side of the sheet.

10. An image erasing method comprising:
receiving a sheet through a sheet insertion opening;
conveying, with a first conveying unit that includes a conveying path from the sheet insertion opening to a sheet discharge unit, the sheet in a first conveying direction to a scanning unit;
converting, in the scanning unit, an image formed on a sheet into image data;
storing the image data in a memory unit;
conveying a sheet, which is subjected to the conversion and not subjected to the erasure, to a storage unit with a second conveying unit that branches from the first conveying unit at a downstream side of the scanning unit and an upstream side of an erasing unit in the first conveying direction;
displaying the image data stored in the memory unit on a display unit;
receiving an instruction from a user via an input unit; and
when the instruction is an erasure instruction, conveying the sheet from the storage unit to the erasing unit for erasing the image formed on the sheet.

11. The method according to claim 10, further comprising determining which side of the sheet that the image is formed on.

12. The method according to claim 10, wherein when image data of a plurality of sheets are collectively generated, image data of only an initial single sheet is displayed on the display unit, and
when the erasure instruction only for the initial single sheet is received via the input unit, all of the stored sheets are conveyed from the storage unit to the erasing unit and all the images thereon are erased.

13. The method according to claim 10, wherein when the instruction is an erasure cancel instruction, the stored sheet is conveyed to the sheet insertion opening.

14. The method according to claim 10, further comprising conveying the sheets subjected to the erasure to different cassettes depending on the sheet size.

* * * * *